Figure 1:
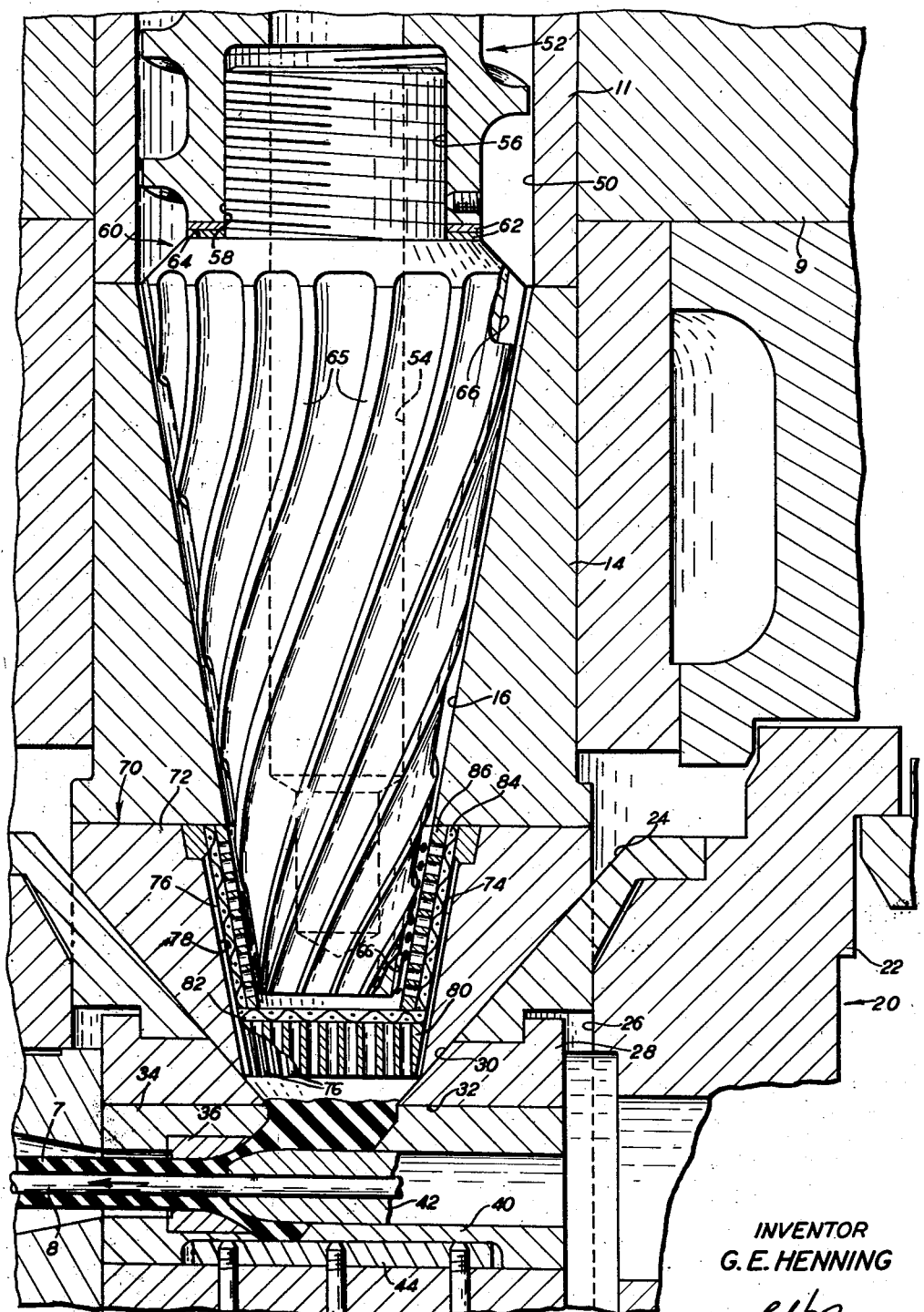

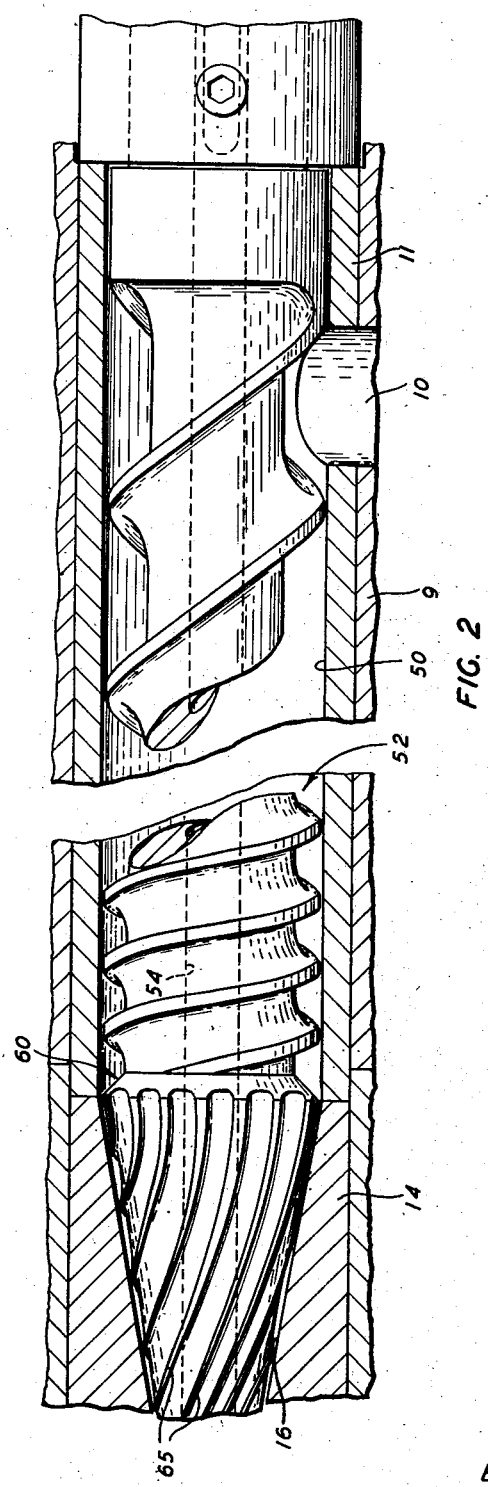

Patented Oct. 30, 1951

2,573,440

UNITED STATES PATENT OFFICE 2,573,440

APPARATUS FOR PLASTICIZING PLASTIC MATERIAL

George E. Henning, Baltimore, Md., assignor to Western Electric Company, Incorporated, New York, N. Y., a corporation of New York Application May 6, 1948, Serial No. 25,368

2 Claims. (Cl. 18—13)

This invention relates to apparatus for plasticizing plastic material, and more particularly to apparatus for plasticizing organic, plastic material.

In the manufacture of insulated conductors, plastic material, such as a vulcanizable compound including rubber or synthetic rubber-like materials, or a thermoplastic compound, sometimes is milled to thoroughly mix and plasticize the material so that it may be extruded readily. The plasticized material then is inserted into an extruder, which extrudes the material upon a conductor while the material is plastic. Such milling operations are relatively expensive and require additional handling of the material. It has been proposed to simultaneously work and plasticize such material as the material is forced through an extruder. However, if the material is one which includes an accelerator to hasten vulcanization of the material, the material might set up in the extruder or prevulcanize. Such prevulcanization would require frequent cleaning to maintain the necessary extrusion capacity of the extruder.

An object of the invention is to provide new and improved apparatus for plasticizing plastic material.

An apparatus illustrating certain features of the invention may include an extruding head, an extruding cylinder having an extruding passage therein, and a stock screw mounted in the passage for working organic, plastic material and for advancing the material along the passage, said stock screw and said passage being so constructed and arranged that they form a flow passage therebetween of continuously diminishing cross-sectional area in the portion thereof extending to the extruding head.

A complete understanding of the invention may be obtained from the following detailed description of an apparatus forming specific embodiments thereof, when read in conjunction with the appended drawings, in which:

Fig. 1 is a fragmentary, transverse, horizontal section of an apparatus forming one embodiment of the invention, and Fig. 2 is a reduced, fragmentary, longitudinal, horizontal section of the apparatus.

Referring now in detail to the drawings, there is shown in Fig. 1 an extrusion apparatus for forming a covering 7 of a plastic material around a filamentary conductor 8, which may be bare or may be covered with a textile or plastic covering. The plastic material employed may be an accelerated, vulcanizable compound including a rubber or synthetic, rubber-like material, or a compound including thermoplastic material.

The extrusion apparatus includes an extrusion cylinder 9, which may be heated or cooled and which is provided with a charging opening 10 (Fig. 2). A liner 11 fits into the cylinder and extends from the charging end of the cylinder to a point short of the delivery end of the cylinder.

An adapter 14 fits into the delivery end of the cylinder 9 and abuts the liner 11. The adapter 14 is provided with a frustoconical passage 16 formed therein. An extrusion head 20 hinged to the extrusion cylinder 9 is provided with a body member 22 having a tapered socket 24 therein, which communicates with a bore 26 formed in the extruding head concentrically with of the tapered socket 24. A cylindrical tool holder 28 fits into the bore 26 and is provided with a frustoconical passage 30 forming a continuation of the frustoconical socket 24. The tool holder also is provided with a bore 32 extending transversely with respect to the axis of the frustoconical passage 30. An annular die holder 34 holding a die 36 is mounted in the left hand end of the bore 32, as viewed in Fig. 1. A core tube holder 40 supporting a core tube 42 is mounted in a right hand end of the bore 32, and an alignment plate 44 holds the core tube holder 40 and the die holder 34 in alignment with one another, thereby holding the core tube 42 and the die 36 in alignment.

The liner 11 has a constant diameter passage 50 therein, within which is positioned a stock screw 52 having substantially constant thread and root diameters from the charging end of the cylinder 9 to the inner end of the liner 11. The stock screw 52 is provided with a central cooling passage 54, and also is provided with a threaded counterbore 56 into which a threaded shank 58 of a stock screw extension 60 is threaded. The position of the stock screw 52 longitudinally in the liner 50 is fixed, and the longitudinal position of the extension 60 with respect to the adapter 14 is controlled by the size and number of shims 62—62 positioned between a shoulder 64 formed on the extension 60 and the delivery end of the stock screw.

The extension 60 is provided with a plurality of ribs 65—65, which are spiraled therearound to advance the material, and is generally complementary to the frustoconical passage 16 in the adapter 14. However, the height of the ribs decreases continuously from the upper ends of the ribs, as viewed in Fig. 1, to the lower ends thereof so that grooves 66—66 formed between the ribs decrease in cross-sectional area from the upper ends to the lower ends thereof.

A strainer assembly 70 is designed to fit tightly between the adapted 14 and the extruding head 22. The assembly 70 includes a frustoconical holder 72, which is designed to fit into the socket 24 of the extruding head and the passage 30 in the tool holder 28. The holder 72 is provided with a frustoconical passage 74 provided with ribs 76—76 forming grooves 78—78 therebetween. The grooves 78—78 converge from the upper ends to the lower ends thereof, as viewed in Fig. 1. A backing plate 80 fits into the lower portion of the passage 74 and the holder 72, and a screen 82 fits on the backing plate. A frustoconical screen 84 is designed to fit into the passage 74 and a frustoconical breaker plate 86 fits into the frustoconical screen 84 and extends substantially beyond the adapter 14.

The strainer assembly 70 may be taken out of the extrusion apparatus easily by swinging the head 20 away from the cylinder 9 and sliding the assembly off of the end of the extension 60. A second assembly identical with the assembly 70 then may be substituted for the assembly 70 and the head 20 swung back to the cylinder 9 to force a holder, corresponding to the holder 72, tightly against the adapter 14 and tightly into the socket 24 in the body member 22 of the head 20 and the passage 30 in the tool holder 28 to form tight joints therebetween.

*Operation*

A suitable plastic compound is introduced into the extruding cylinder 9 through the opening 10 and is advanced by the stock screw 52 through the liner 11. The stock screw extension 60 works the plastic material with increasing intensity and increases the velocity thereof toward the delivery end of the cylinder. The material flows between the stock screw extension and the wall of the tapered passage 16 in the adapted 14, and is thoroughly masticated by the ribs 65—65 of the extension 60 so that the material is ready for extrusion by the time it passes into the extrusion head 20. The velocity of the material is continuously increased from the stock screw end of the extension 60 to the tip of the extension 60 and flows through the strainer assembly 70 into the tapered passage 30 in the tube holder 28 from which it is forced immediately through the die 36 which forms the material into the covering 7.

The portion of the stock screw extension 60 which extends into the frustoconical breaker plate 86 forces part of the material through the breaker plate and through the screen 84 behind the breaker plate which is supported by the ribs 76—76, and this portion of the material flows along the grooves 78—78 formed in the holder 72. The rest of the material flows through the screen 82 and the backing plate 80 into the frustoconical passage 30. Thus, a large straining area is provided. The material is worked further between the breaker plate 86 and the tip of the stock screw extension 60, and also is worked as it is forced through the breaker plate 86, the screens 84 and 82 and the backing plate 80 so that it is thoroughly plasticized as it is forced through the die 36.

Since the velocity of the material is increased from the upper end of the stock screw extension 60 (Fig. 2) to the lower end of the strainer assembly 70, the material passage is continuously flushed throughout its length, thereby preventing setting up of a vulcanizable material prior to extrusion thereof. The material is worked severely and with increasing intensity as it is forced along the stock screw extension. Thus, the material is not worked severely until the portion of its travel just before it is forced into the extruding head so that accelerated material will not set up prior to the point of extrusion thereof, but is ready to set up immediately after the point of extrusion.

The shims 62—62 between the stock screw 52 and the stock screw extension 60 may be varied to move the extension 60 relative to the wall of the frustoconical passage 16 in the adapter 14 so that the clearance between the ribs 65—65 and the wall of the frustoconical passage may be varied, thereby varying the intensity with which the stock screw extension 60 works the plastic material advanced therealong. Thus, the intensity of working the material at the portion of its path just before the point of extrusion may be varied over a wide range to obtain optimum working intensities for compounds of different compositions. The strainer assembly 70 may be removed easily from the apparatus and cleaned or replaced with a minimum loss of operation time of the extruding apparatus.

What is claimed is:

1. An apparatus for working and extruding organic, plastic material, which comprises an extruding cylinder having a passage therein, a liner positioned in the passage and extending from the entrance end thereof to a point short of the delivery end thereof, a stock screw mounted rotatably in the liner, an adapter provided with a frustoconical passage therein designed to abut the delivery end of the liner, a frustoconical extension secured to an end of the stock screw and projecting along and beyond the adapter, an extruding head secured pivotally to the extrusion cylinder and being provided with a frustoconical socket therein, a frustoconical strainer holder provided with a frustoconical passage therein designed to fit over the end of the extension and fit into the socket in the extruding head, and a cup-shaped strainer element designed to fit into the strainer holder.

2. An apparatus for extruding organic, plastic material, which comprises an extruding cylinder, an extruding head secured detachably to the extruding cylinder, said head being provided with a frustoconical socket therein, a frustoconical holder designed to fit removably into the socket in the extruding head for connecting the extruding cylinder to the extruding head, said holder being provided with a passage therein, and a strainer mounted in the passage in the holder.

GEORGE E. HENNING.

REFERENCES CITED

The following references are of record in the file of this patent:

UNITED STATES PATENTS

| Number | Name | Date |
|---|---|---|
| 300,882 | Merrill | June 24, 1884 |
| 682,390 | Schrader | Sept. 10, 1901 |
| 1,092,451 | Pierce | Apr. 7, 1914 |
| 1,320,718 | Steinle | Nov. 4, 1919 |
| 1,912,374 | Johnson | June 6, 1933 |
| 1,935,050 | Gordon | Nov. 14, 1933 |
| 2,218,138 | Stricklen | Oct. 15, 1940 |
| 2,286,405 | Gordon | June 16, 1942 |
| 2,319,859 | Hale | May 25, 1943 |
| 2,370,952 | Gordon | Mar. 6, 1945 |

FOREIGN PATENTS

| Number | Country | Date |
|---|---|---|
| 24,738 | Great Britain | 1910 |